United States Patent Office 3,414,424
Patented Dec. 3, 1968

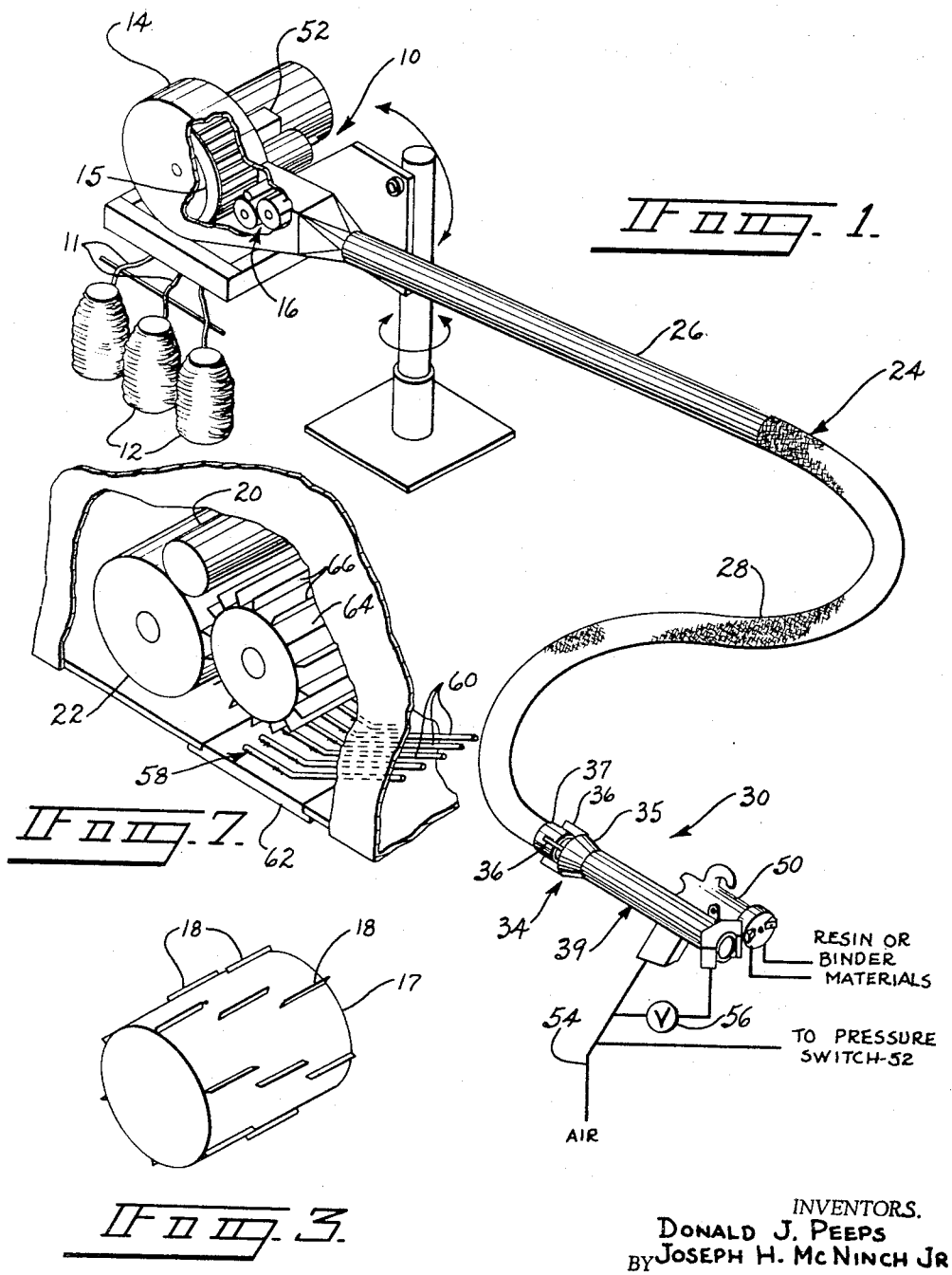

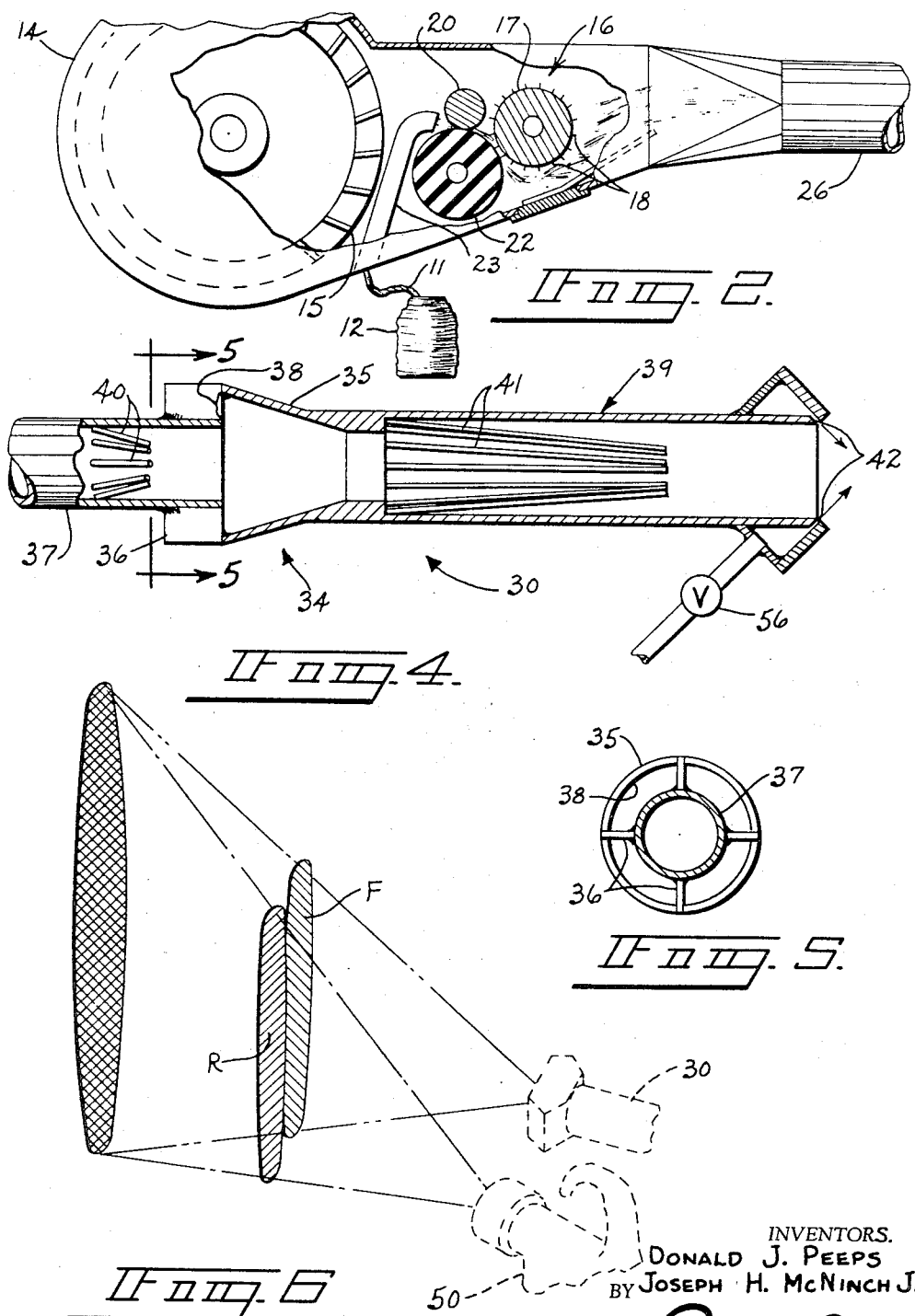

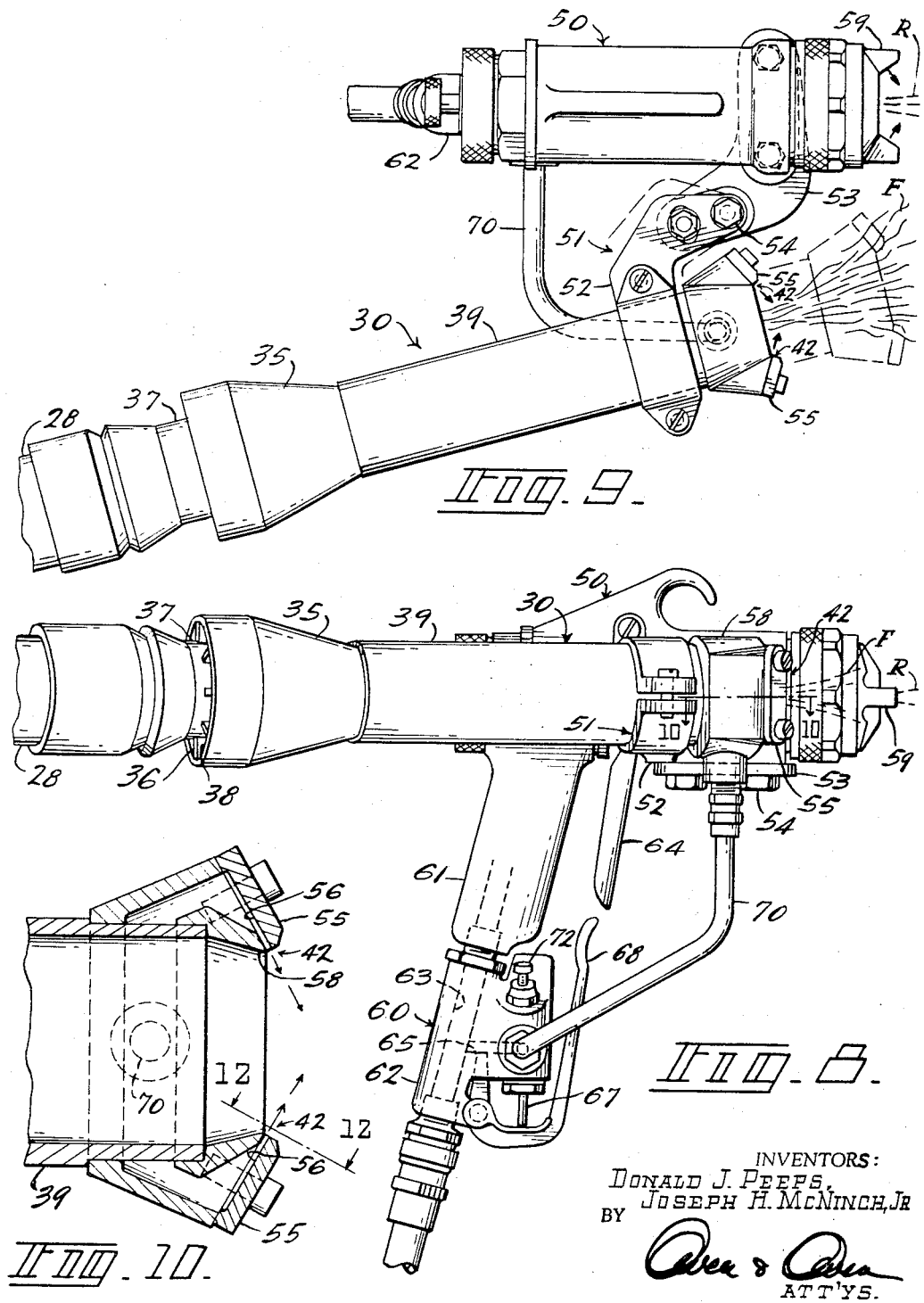

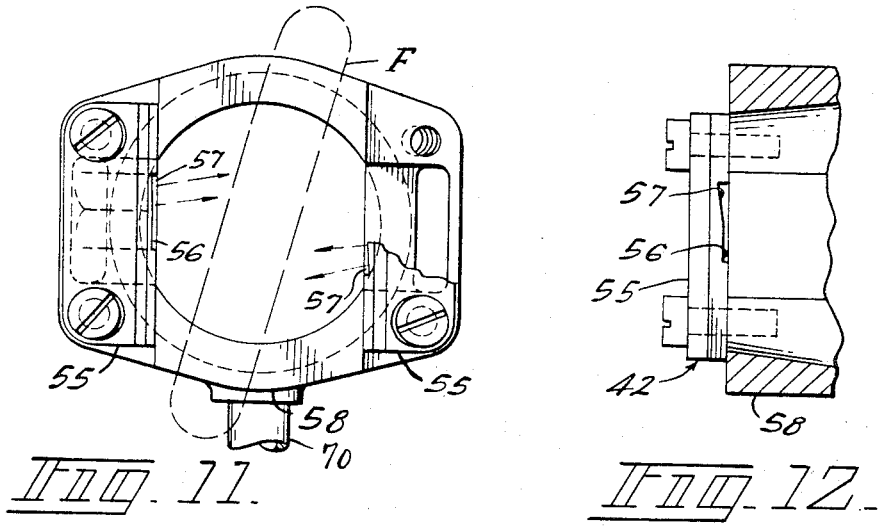
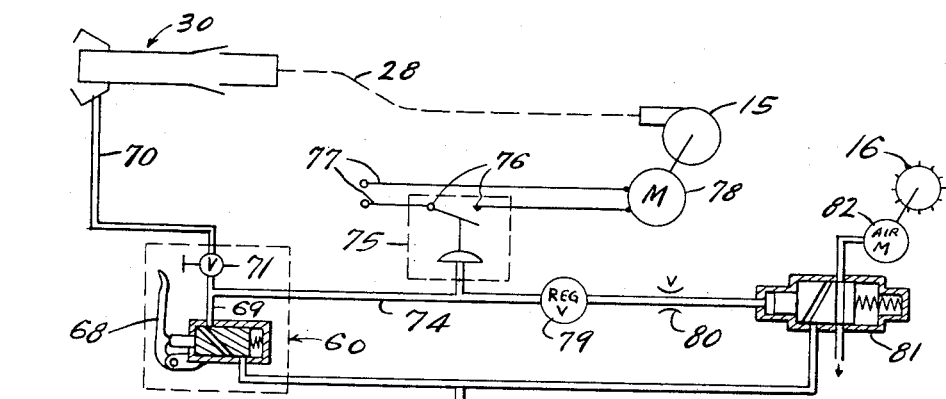
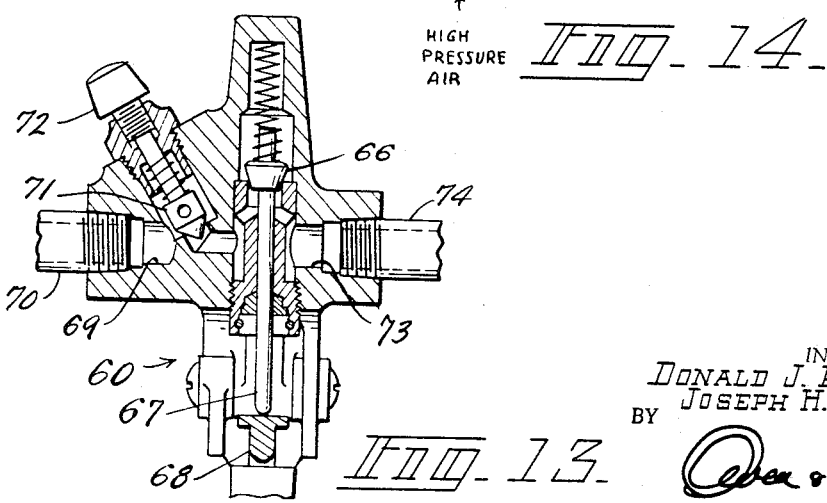

3,414,424
METHOD FOR SPRAYING FIBERS AND RESINOUS MATERIALS
Donald J. Peeps, Rossford, and Joseph H. McNinch, Jr., Columbus, Ohio, assignors to The DeVilbiss Company, Toledo, Ohio, a corporation of Ohio
Application Feb. 19, 1965, Ser. No. 437,629, now Patent No. 3,249,307, which is a continuation-in-part of application Ser. No. 230,916, Oct. 16, 1962. Divided and this application Nov. 19, 1965, Ser. No. 508,807
2 Claims. (Cl. 117—5.1)

This application is a division of Ser. No. 437,629, now U.S. Patent No. 3,249,307 filed Feb. 19, 1965 which is a continuation-in-part application of Ser. No. 230,916 filed Oct. 16, 1962 and now abandoned.

The present invention relates to a method for forming fiber-reinforced resinous articles and particularly to such a method where the fibrous material is first cut and then transported by gaseous flow through a conduit to a spray head where it is expelled. The material is then blended with the resin components and the resulting mixture is deposited on a working surface to form the article.

One method previously used in the art of forming articles of fiber-reinforced, resinous material was to supply fibers chopped or cut to a desired length, transport these fibers through a conduit to a spray head, mix the fibers with resinous materials which were also supplied to the spray head prior to expulsion of the fibers from the spray head, and then to apply the fiber-resin mixture to the working surface. The working surface was a mold or an article to be coated or covered with the mixture of fibers and resin.

In such a process problems often were encountered during the transportation of the fibers through the conduit. When the fibers were of adequate length to give satisfactory reinforcement, they became entangled in the conduit thus creating a restriction and ultimately blocking the passage or conduit. When relatively short lengths of fiber were used, the restriction problem was not encountered, but the short fibers, when combined with the resinous materials for the production of a reinforced article were found to be inferior from a standpoint of reinforcing strength.

Another problem encountered in the prior art was the difficulty which the operator had in lifting and controlling the fiber and resin spray apparatus. The bulky and heavy apparatus made it very difficult for one man to operate and perform the spraying function in a satisfactory manner. Also, the operator could not adjust and control the many variables, such as fiber and resin spray patterns, fiber velocity, etc., and still perform the spraying function.

It is an object of the present invention to provide a novel method for the transportation of relatively long fibers, necessary for the adequate reinforcement of the articles being produced, through a conduit. The invention is usable not only in the direct production of fiber-reinforced resin articles, but also in the making of "preforms" to be used in a subsequent resin molding operation.

It is another object of the invention to provide a relatively lightweight spray head assembly which will greatly facilitate handling and ease of operation.

A further object of the invention is to provide a method for spraying resin and fibers, which provides a unique spray pattern.

It is another object of this invention to provide an improved control means for the fiber forming and spraying devices, whereby the operator can control the individual spray patterns of the resin and the fibers.

Further objects of this invention will become apparent from the following specification and drawings in which:

FIG. 1 is a diagrammatic view of apparatus embodying the present invention and capable of carrying out our new method;

FIG. 2 is a side elevational view of the blower and chopper assembly with parts broken away;

FIG. 3 is a perspective view of the chopper wheel;

FIG. 4 is a fragmentary longitudinal sectional view showing the internal structure of the spray head;

FIG. 5 is a section on line 5—5 of FIG. 4;

FIG. 6 is a diagrammatic perspective view of the spray heads and their respective discharge patterns;

FIG. 7 is a fragmentary perspective view of the chopper assembly, with parts broken away;

FIG. 8 is an enlarged view in side elevation of the spray apparatus shown in FIG. 1;

FIG. 9 is a top view of the spray apparatus of FIG. 8;

FIG. 10 is a further enlarged view in horizontal cross section of side nozzles for the fiber spraying apparatus;

FIG. 11 is a front view of the fiber spray head of FIGS. 8, 9, and 10, with parts broken away and showing a fiber spray pattern produced thereby;

FIG. 12 is a detailed, fragmentary view taken along the line 12—12 of FIG. 10;

FIG. 13 is a view in vertical cross section of a control valve shown in FIG. 8; and FIG. 14 is a schematic circuit diagram of controls used with the spray apparatus.

Briefly, the present invention includes a method for depositing resinous material and reinforcing fibers on a mold or other working surface by cutting strands or roving of fibers (such as glass fibers) into appropriate lengths, conveying the cut fibers through a conduit with air moving at relatively high velocity, centering the fibers in the conveying tube and, at the same time, causing a more equal longitudinal flow of fibers in the tube, then rapidly dissipating the conveying air prior to the discharge of the fibers from the conduit, discharging the fibers from the conduit in a fan-shaped pattern and, if desired, coating the fibers with resin prior to deposition on the mold or working surface. The invention further contemplates formation of a novel fiber spray pattern by directing side streams of air against the main fiber pattern in an asymmetrical manner whereby the pattern is elongated and tilted between the point of emission and the work surface. The intersection of the fiber spray pattern and the resin spray pattern also can be controlled to occur at the work surface or at some point prior thereto, if desired. A control system for the deposition may be employed by which discharge of the resin components and actuation of the fiber cutting and conveying system are under independent controls of the operator from the point of handling of the depositor.

A preferred embodiment of the invention is shown in the drawings and includes a fiber-supplying device indicated at 10. Fibers 11 in the form of rovings or strands are fed from one or more spools 12 into the device, which, in the embodiment shown, includes a housing 14 containing both a blower 15 and a suitable cutting or chopping mechanism indicated at 16. In accordance with the invention the cutting or chopping mechanism 16, as best shown in FIG. 2, comprises an assembly including a driven chopper wheel 17 which has blades 18 attached in staggered or stepped relationship upon its circumference. The cutting mechanism 16 also includes an idler roller 20 and a rubber roller 22 which provides a cutting surface for the blades 18 on the chopper wheel 17. A tube 23 directs the rovings or strands of fiber 11 between the rubber roller 22 and the chopper wheel 17 where they are cut into uniform lengths, usually from one-half to two inches, depending on the application. By cutting the different rovings or fiber strands 11 at evenly spaced intervals a continuous stream of glass fibers is introduced into conduit 24, and the quality of the laminate is improved.

The staggered relationship of the blades 18, as shown in Fig. 3, has the additional advantage of staggering the individual cut fibers to even out the flow of fibers into the conveying air stream and to assure that unit density of the stream is made more uniform. Cut fibers or cut glass fibers, in this instance, are then introduced into the conduit 24 where they are forced through the conduit by air which is introduced by the blower 15. The conduit 24 can be of any suitable material, either flexible or inflexible or a combination of both, as shown in the embodiment of the present invention depicted in FIG. 1. The conduit 24 includes an inflexible boom 26 which provides support for a flexible hose portion 28 of the conduit and also extends the range of the apparatus by providing a smooth, straight passage for the cut fibers. The flexible hose portion 28 connects the end of the boom 26 with a fiber spray head designated generally 30 to allow freedom of movement for the operator.

The air conveying the chopped fibers through the conduit 24 must move at a substantial velocity, too high for a proper discharge of the fibers toward the work. To overcome this, the excess conveying air is separated from the main stream, which consists of the conveying air and cut fibers, by a flow divider 34 (see also FIG. 4). This step is a very important element of the present invention because if the air at the quantity and velocity required to transport the fibers through the conduit 24 without restriction or blocking were permitted to enter the deposition zone, it would cause the fibers to "bounce" or scatter in a nonuniform manner away from the mold or working surface. The excess air would also make it difficult to fan the fiber stream into the desired shape. The flow divider 34 allows the excess conveying air to be dissipated, so that the cut fibers will not "bounce" or be carried away from the working surface by the air flow, but will be distributed uniformly and smoothly.

In the preferred form, the flow divider 34 comprises an enlarged conical collar 35 attached by supports 36 to a connecting nipple 37 of the fiber spray head 30, and tapering forwardly to leave a rearwardly directed air relief opening 38 between the nipple 37 and a nozzle member 39. Much of the air in the conduit 24 is dissipated through the opening 38 and gives the resin a better chance to wet the fibers prior to their deposition upon the working surface.

Fingers or combs 40 and 41 are provided on each side of the flow divider opening 38 in the instant embodiment of this invention. The fingers or combs 40 and 41 extend inwardly and toward the direction of fiber flow to center the fibers relative to the adjacent walls of the conduit to overcome the tendency of the glass fibers to cling to a wall of the nozzle 39 against which they may be thrown by centrifugal force arising by a bend in the hose 28. The fingers also have the effect of combing out any clumps of fibers that may appear at the discharge end of the hose 28 and thus improve the longitudinal distribution of the stream. The combs 40 and 41, shown best in FIG. 4, are constructed of wire fingers, but could be constructed of nylon or other suitable abrasive-resistant material.

The location of the combs 40 and 41 on both sides of the air relief opening 38 is a preferred arrangement but is not a critical one, and combs could be placed on only one side of the opening or some other means could be used which would serve the purpose of centering the fibers into a substantially uniformly distributed mass.

After the excess air is dissipated by the relief opening 38, the cut fibers are expelled from the fiber spray head 30 through a main nozzle opening in the nozzle 39 which is preferably of full diameter. The fiber spray head 30 is equipped with fan openings for side nozzles 42 which direct air against opposite sides of the stream or spray of fibers to shape the fiber stream in a thin, elliptical pattern or configuration. The elliptical pattern of the fiber stream can be adjusted at the spray head by the operator by varying the volume of side air used. It has been found in practice that the side air jets greatly improve the deposition of the glass fibers on the working surface and make possible the production of improved, more uniform "preforms" for subsequent molding operation.

Resinous material is supplied by a suitable spray gun 50 such as that disclosed in United States patent to Peeps, No. 2,971,700, which is very satisfactory for use in the present combination and process. This spray gun is a two-component gun, which allows chemically reactive liquids to be sprayed from the same gun without internal mixing. Two spray guns also could be used, each of which carriers a separate phase of the resin system, although the two-component gun has the advantage of minimizing the number of controls which the operator has to manipulate. The resinous material is sprayed from the two-component gun 50 in a fan-shaped pattern, as seen in FIG. 6, with the two-component resin spray, designated R, and the fiber spray, designated F, converging at a point slightly above the mold or working surface. With both streams having the disclosed fan-shaped patterns as shown in FIG. 6, the "crossing" of the components is minimized and thorough mixing results.

In a preferred form, the fiber spray head 30 and the two-component gun 50 are connected by a bracket 51 (FIGS. 8 and 9) which include arms 52 and 53 connected by a pivot 54. With this bracket, the fiber spray head 30 and the spray gun 50 can be angularly adjusted so that the resin spray R and the fiber spray F can intersect at any predetermined point. In addition, the spray gun 50 can be moved longitudinally, if desired, to change the degree of dispersion of the fibers at the point of intersection with the resin spray. While it is preferred to have the resin and fibers meet substantially at the work surface, better mixing sometimes can be obtained by intersecting the two sprays substantially before they reach the work surface. In other instances, it might be preferred to deposit the fibers on the work surface first and then immediately cover them with the resin.

In a preferred form, the air emitted from the side nozzles 42 is not directed symmetrically against the fiber spray pattern F, but, rather one air stream is directed principally against the spray pattern at a point slightly above the horizontal center line of the pattern (see FIG. 11) while the opposite air stream is directed principally at a point slightly below the horizontal center line. In the particular instance, this is accomplished by a special nozzle plate 55 shown in FIGS. 10 and 11. The plate 55 has a narrow slot 56 and a slightly wider slot 57 tapering away from the slot 56 and having its widest portion at the end opposite the slot 56. The slots 56 and 57 cooperate with a nozzle member 58 to provide an elongate nozzle which directs the heaviest portion of the air stream toward the spray pattern at the point above the horizontal center line thereof in the case of the left hand side nozzle. For the opposite side, the plate 55 is reversed so that the heaviest portion of the air is directed toward the fiber spray pattern below the horizontal center line. In this manner, the fiber spray pattern is more effectively shaped to the elongated, elliptical pattern than if the side air streams were directly opposed. In the latter instance, the spray pattern tends to produce a dumbbell shape even if the side air streams are quite broad.

The asymmetrical positioning of the side air streams also causes the spray pattern to be tilted at an angle, as shown in FIG. 11. The fiber spray pattern, in this instance, can be oriented to a vertical position simply by loosening the bracket 51 and rotating the spray head 30 until the spray head 30 is vertical with the side nozzles 42 then being at an angle.

If the present invention is to be used in the manufacture of "pre-forms," the two-component gun will not be required, and a simple spray gun for the binder material can be employed. The binder gun, in these instances, can be made completely separate from the glass dispenser and can be automatically controlled.

The degree of flatness of the fiber spray pattern can be controlled by the quantity and velocity of air supplied to the side nozzle 42. Partly for this purpose, a manually-operated valve 60 is attached to and carried subjacent a handle 61 (FIG. 8) of the spray gun 50. The valve 60 includes a valve body 62 having a central vertical passage 63 through which air is supplied directly to the spray gun 50 where it is independently controlled by a valve operated by a spray gun trigger 64. The trigger 64 not only controls the air for the spray gun 50 but also controls the resin or other coating material supplied thereto, as is known. When the trigger 64 is pulled, regardless of the position of the valve 60, the resin is sprayed entirely independently of the operation of the fiber spray head 30.

The valve body 62 also includes a branch passage 65 (FIG. 8) controlled by a valve 66 (FIG. 13) which is opened and closed by a stem 67 cooperating with a manually-operated trigger 68. The trigger 68 extends upwardly close to the lower end of the spray gun trigger 64 whereby the trigger 68 can be readily operated by the same hand used to control the trigger 64. Preferably, the lower trigger 68 is controlled by the little finger of the operator while the upper fingers are used to control the trigger 64.

When the trigger 68 is pulled, it forces upwardly the stem 67 and causes the valve 66 to move from its seat. Air can then flow through a branch passage 69 and a line 70 to the side nozzles 42. Since the valve 66 and the trigger 68 are designed to be normally operated either fully opened or fully closed, the volume of air supplied through the line 70 is regulated by a needle valve 71 which can be turned by a control knob 72 to control the volume of air. With a greater volume of air supplied through the line 70 to the nozzles 42, the fiber spray pattern F tends to assume a flatter elliptical pattern and vice versa. If the needle valve 71 is closed entirely, then the fiber pattern is round, which is particularly advantageous for covering certain work surface configurations, such as corners. The valve 60 not only enables control of both the fiber spray head 30 and the spray gun 50 with one hand of an operator, but also enables full control over the spray pattern of the fibers to be attained.

The valve 60 also through suitable control devices provides full control over the starting and stopping of the fiber feed mechanism. For this purpose, the valve body 62 has an additional outlet passage 73 to which a control line 74 is connected. Each time the trigger 68 is pulled and the valve 66 is opened, air is supplied through the line 74 to operate suitable controls, regardless of the position of the needle valve 71.

In the preferred form of operation, the blower supplying air to transfer the fibers to the spray head 30 is started prior to the fibers being supplied to the spray head. This prevents the possibility of the fibers being chopped and piled up at the forward end of the boom 26 before they can be carried away by the air. Similarly, when the unit is turned off, the supply of fibers should be stopped before the blower is stopped so that most, if not all, of the fibers will be cleared from the conduit 24.

When the valve 60 is opened, high pressure air from a suitable source is supplied to the side nozzles 42 as well as the line 74. The line 74 communicates with a pressure switch 75 which closes contact 76 when the pressure in the line 74 reaches a predetermined value. A circuit thereby is completed through electrical lines 77 for a blower motor 78 which operates the blower 15 and supplies air through the boom 26 and the flexible line 24 to the fiber spray head 30. Air in the line 74 also is supplied through a regulator 79 and a variable orifice or air control valve 80 to a pneumatically-actuated control valve 81. The air from the line 74 actuates the valve 81 after a predetermined period of time in the order of two or three seconds, to supply air from the high pressure source to an air motor 82 which drives the cutter mechanism 16 and supplies fibers to the fiber spray head after the blower has begun to operate.

Similarly, when the manually-operated valve 60 is closed and air to the line 74 is shut off, the valve 81 will return to the closed position as the volume of air supplied through the orifice 80 immediately decreases. However, the pressure switch 75 will remain energized for two or three seconds longer until the pressure in the line 74 drops below a predetermined minimum. This assures that fibers in the conduits will be blown out and not be left in a position to cause plugging.

Glass fibers used for reinforcement of plastic objects are of two types: first, a parallel strand, multiple filament roving which may be chopped and fed by the apparatus described above; and second, a so-called "spun roving" in which the strands making up the roving have been looped back on themselves by means of a roving cone, as shown, for example, in Patent No. 2,719,352. A roving of either type may typically comprise sixty or eighty strands, each containing approximately two hundred filaments.

A certain degree of separation of the roving into its strands is desired with both types of roving, and such separation takes place to the desired extent under the influence of the conveying air and with the combing fingers 40 and 41 in the case of parallel strand roving. However, it has been found that spun roving is separated into its constituent strands with greater difficulty and is better separated and better prepared by an initial combing performed immediately after the chopping step. To this end, the present invention provides a removable comb element 83 having spaced, parallel, upwardly and forwardly projecting fingers or teeth 84. The fingers are conveniently formed of wire and are fixed to a suitable base 85 which is inserted in an appropriate opening in the housing 14 beneath the chopper assembly whenever spun roving is used. This is replaced by a smooth flat plate whenever the machine is to be used with parallel-strand roving. Any suitable latching device may be used to retain the comb-carrying plate 85 or the smooth plate in place.

Sun roving is chopped by a modified chopper wheel 86 having more closely spaced blades 87 extending completely thereacross. The chopped roving is immediately forced through the comb fingers 83 and the roving is separated into its constituent strands or "ends." While the separation may be started by the comb fingers 83, it is probably augmented by the conveying air. In the absence of the comb fingers 83, it has been found that spun roving will usually emerge from the discharge end of the device without separation and in gross, chopped segments.

While the present invention has been disclosed in connection with a specific arrangement and disposition of the parts, it should be expressly understood that numerous modifications and changes may be made without departing from the scope of the appended claims.

We claim:

1. In a method for depositing a mixture of resinous material and reinforcing fibers on a mold surface, said method comprising the steps of supplying cut fibers to a conduit, introducing conveying air under pressure into said conduit for conveying said cut fibers through said conduit, forcing said cut fibers toward the center of said conduit, dissipating excess conveying air laterally and rearwardly from the main fiber mass while continuing to convey said cut fibers with the remaining air, discharging said cut fibers from a fiber spray nozzle, providing a spray of resinous bonding material which converges with said stream of cut fibers after discharge of said fibers from said conduit, and depositing the resultant mixture upon a working surface.

2. The method defined in claim 1 and the additional step of applying air streams to opposite sides of the stream of discharged fibers to shape said stream into a flattened configuration.

References Cited

UNITED STATES PATENTS

| | | | |
|---|---|---|---|
| 1,885,645 | 11/1932 | Vawter | 239—549 |
| 2,646,313 | 7/1953 | Peeps | 239—296 |
| 2,805,640 | 8/1957 | Davis et al. | 118—303 X |
| 2,872,337 | 2/1959 | Heritage et al. | 117—16 X |
| 3,015,127 | 1/1962 | Stalego | 239—290 X |
| 3,033,472 | 5/1962 | Shelton | 117—105 X |
| 3,039,702 | 6/1962 | Shelton | 239—296 X |
| 3,111,272 | 11/1963 | Underdown et al. | 239—422 X |
| 3,168,411 | 2/1965 | Walsh | 239—422 X |

ALFRED L. LEAVITT, *Primary Examiner.*

A. GOLIAN, *Assistant Examiner.*